May 26, 1959
F. J. GELINAS
2,887,813
ICE FISHING DEVICE
Filed June 24, 1958
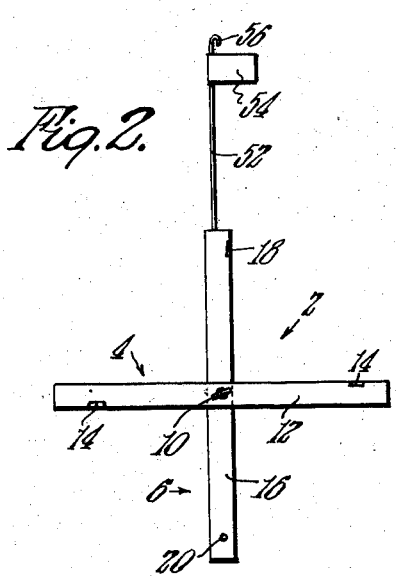
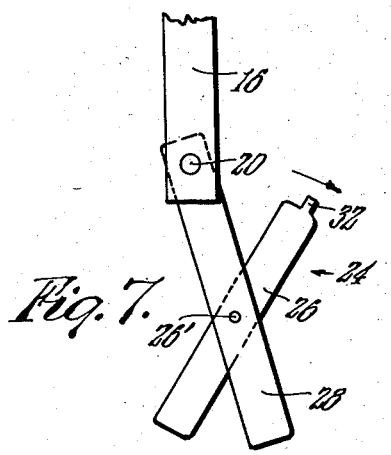
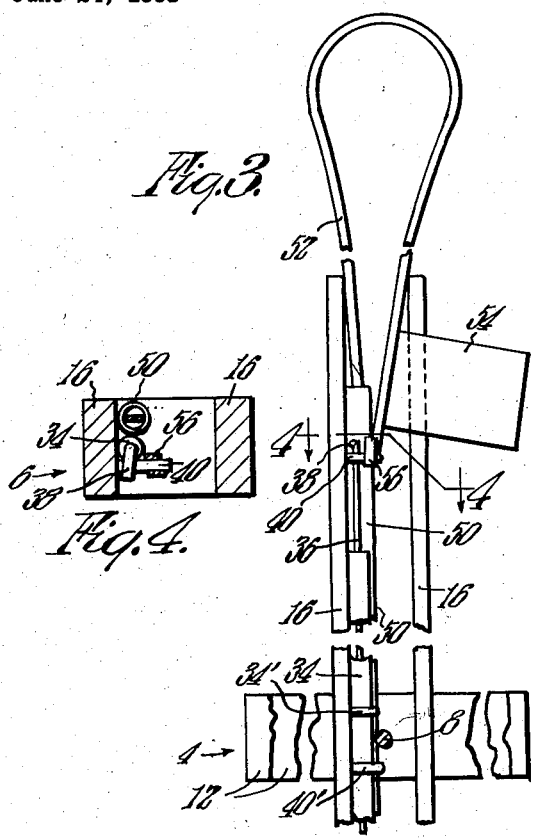
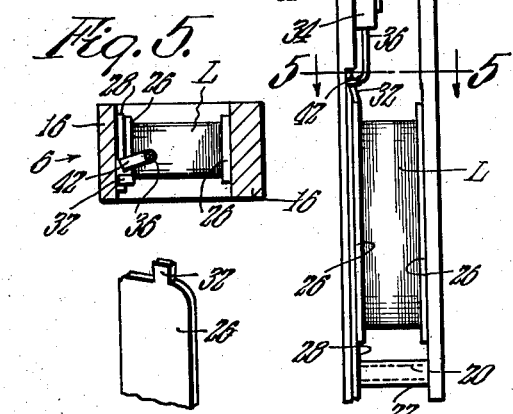
INVENTOR.
Francis J. Gelinas
BY Ross & Ross Attys.

United States Patent Office 2,887,813
Patented May 26, 1959

2,887,813

ICE FISHING DEVICE

Francis J. Gelinas, Chicopee, Mass.

Application June 24, 1958, Serial No. 744,122

1 Claim. (Cl. 43—17)

This invention relates to improvements in fishing a tip-up such as used by fishermen in fishing through the ice.

The principal objects of the invention are directed to the provision of a fishing tip-up constructed and arranged to provide a neat compact package when in the collapsed condition so as to enclose and conceal the operating components thereof.

The tip-up of the invention is easily and readily set up for use on the ice, and is as easily collapsed for carrying and storage purposes.

Various changes and modifications may be made in the form of apparatus within the spirit and scope of the invention which, in the presently preferred form thereof, is shown in the accompanying drawing wherein:

Fig. 1 is a perspective view showing the tip-up of the invention in collapsed relation;

Fig. 2 is an elevational view of the tip-up shown in Fig. 1, in set up relation;

Fig. 3 is an enlarged side elevational view showing the tip-up in set up relation;

Figs. 4 and 5 are sectional views on the lines 4—4 and 5—5 respectively of Fig. 3;

Fig. 6 is a perspective view of one of the side flanges of the line reel; and

Fig. 7 is a side elevational view of the lower end of the inner or support member of the tip-up, showing the reel.

Referring now to the drawings more in detail, the novel features of the invention will be fully described.

The tip-up 2 of the invention includes, in general, a housing 4 and an inner support 6 which is swingable in the housing 4 on a pivot screw 8, between the collapsed relation shown in Fig. 1, and the set up relation shown in Fig. 2. A thumb nut 10 on the pivot screw clamps the inner support to the housing in the desired relative position.

The housing 4 is formed from elongated members 12 which are held together in spaced relation by straps 14 secured to opposite ends thereof by screws or the like.

The inner support 6 is likewise formed from elongated members 16 adjacent inner sides of the members 12 of the housing. These members 16 are held together in spaced relation at one end by a strap 18 which has opposite ends secured thereto. The opposite ends of the members 16 are held together in spaced relation by a pivot 20, having a tube 22 therearound, as shown in Fig. 3.

The elongated members of the housing and support may be formed from wood or such other material as may be desired.

A reel or spool 24 for a fish line has opposite end flanges 26, and is rotatable on a pivot 26' of a bar 28 which is pivoted on the pivot 20. The bar 28 may be swung downwardly below the support 6, as shown in Fig. 7. In Fig. 3 the bar and spool are positioned between the side members 16 of the support 6.

In the set up position of the tip-up, shown in Fig. 2, the housing 4 may rest on the ice so that the lower portion of the support 6 depends through a hole in the ice. The line L carried by the spool will depend therefrom into the water, and will carry the usual hook.

The line is wound on the spool in such a way that as a fish takes the hook and line the spool will be rotated in the direction of the arrow of Fig. 7.

As shown in Figs. 6 and 7, one flange 26 of the spool carries an outwardly extending projection or trigger 32.

An elongated guide tube 34, is slidable downwardly from its position, in Fig. 3, to a lower position within staples 34' of member 16. An elongated release rod 36 is turnable in member 34, and has laterally extending upper release and lower catch portions 38 and 42 respectively.

The release and catch portions 38 and 42 of the rod 36 are relatively arranged so that, on rotation of the line spool 24, as the trigger 32 thereof strikes the catch portion 42 of the rod 36, said rod is turned counterclockwise, whereby the release portion 38 turns counterclockwise, as viewed in Fig. 4. As the release portion 38 so turns counterclockwise, it moves outwardly along the stud 40.

An elongated staff guide tube 50 is suitably secured, in any suitable manner, to the inner side of one of the members 16 of the support.

An elongated, resilient, and flat spring like staff 52, having a flag 54 secured to the outer end thereof, is provided. Said flag may be colored red or any other desired color.

The staff 52 is disposed within the tube 50 in the collapsed relation of the support and housing. In the set up relation shown in Fig. 2, the staff is withdrawn outwardly of the tube 50. When withdrawn, the staff is looped around, and a hook 56 on the outer end thereof is hooked over the stud 40, as in Fig. 3. In this position of the staff, the release portion 38 of the rod 36 is disposed at the left of the hook 56, as in Fig. 4.

As the rod 36 is turned by the trigger 32 of the spool which acts on the catch 42 of the rod so as to turn it, the release portion 38 of the rod 36 swings counterclockwise to push the hook end 56 of the staff from off the stud 40.

The characteristics of the resilient staff are such that, when the hook thereof is released from the stud, said staff straightens out to an indicating position, as in Fig. 2, whereby the flag indicates a bite on the line.

The rod 36 is manually turned to position, the release portion as in Fig. 4, to permit hooking of the staff on the stud 40, whereby the tip-up is set for action by the spool, as a fish takes the lines.

To collapse the tip-up, the staff 52 is pushed into the tube 50, and the support 6 is swung to lie within the housing, and is retained therein by tightening the thumb screw 10.

With the bar 28 swung downwardly in line with the lower end of the support, as will be desired in some cases, the guide tube 34 is moved downwardly within the staples 34' to lower positions. This positions the lower end 42 of rod 36 for engagement by the trigger 32 of the spool 24, as said spool rotates.

In this position of the tube 34 and rod 36, the release position 38 of the rod is properly positioned relative to the lower stud 40'. The hook 56 of the staff 52 is then engaged with this lower stud 40', from which it is released by the release portion 38 of rod 36, as the rod is turned by rotation of the spool.

Various changes and modifications may be made in the apparatus, without departing from the spirit and scope of the invention, and therefore it is desired to be limited, if at all, by the appended claim rather than by the foregoing description.

I claim:

A self-storing fishing tip-up comprising, a housing including a pair of elongated relatively-spaced secured-together side walls, a support including a pair of elongated relatively-spaced secured-together side walls, said support being nestable within said housing and intermediate its opposite ends being pivotally connected to said housing intermediate opposite ends thereof for the swinging of said support between an inoperative position within said housing and an operative position perpendicular thereto, securement means for clamping said support in a selected position relative to said housing, a bar pivotally connected at one end thereof to the inner side of one wall of said support, a line reel rotatably mounted on said bar and having a trigger, said bar being adapted to selectively position said reel in a nested position within said support and in an extended position outwardly thereof, a rod guide tube having upper and lower ends and being slidably mounted on the inner side of said one wall of said support for movement between upper and lower positions, a release rod being turnable in said rod guide tube and having upper release and lower catch portions at upper and lower ends of said rod guide tube, said lower catch portion being engageable by the trigger of said reel in the upper position of said rod guide tube with said reel nested within said support and in the lower position of said rod guide tube with said reel in extended position whereby on rotation of said reel said trigger may engage the catch of said rod and turn it in releasing direction, a staff guide tube secured to the inner side of said one wall of said support, an elongated flexible staff slidable in said staff guide tube and having an outer signal portion provided with a signal and an outermost extremity provided with a hook, upper and lower studs on the inner side of said one wall of said support disposed to lie adjacent the release portion of said release rod in the respective upper and lower portions of said rod guide tube, the outer signal portion of said staff being adapted to be looped upon itself for releasably engaging one of said upper and lower studs according to the upper and lower position of said rod guide tube whereby as said release rod is turned in releasing direction the release portion thereof displaces the hook from a stud whereby the signal of the staff assumes an extended signal position.

References Cited in the file of this patent

UNITED STATES PATENTS

| | | |
|---|---|---|
| 2,448,346 | Baugh | Aug. 31, 1948 |
| 2,502,231 | Oberg | Mar. 28, 1950 |
| 2,569,946 | Olesen | Oct. 2, 1951 |
| 2,651,875 | Brockman | Sept. 15, 1953 |
| 2,837,857 | Ellison | June 10, 1958 |